United States Patent
Kim et al.

(10) Patent No.: US 9,253,834 B2
(45) Date of Patent: Feb. 2, 2016

(54) LED DRIVER CIRCUIT HAVING A SENSING UNIT

(75) Inventors: Hyoung-kyu Kim, Cheongju-si (KR); Tae-kyoung Kang, Cheongju-si (KR); Gyu-ho Lim, Cheongju-si (KR); Jin-wook Kim, Cheongju-si (KR)

(73) Assignee: Magnachip Semiconductor, Ltd., Cheongju-si (KR)

(*) Notice: Subject to any disclaimer, the term of this patent is extended or adjusted under 35 U.S.C. 154(b) by 830 days.

(21) Appl. No.: 13/487,738

(22) Filed: Jun. 4, 2012

(65) Prior Publication Data

US 2012/0313536 A1    Dec. 13, 2012

(30) Foreign Application Priority Data

Jun. 8, 2011 (KR) .................. 10-2011-0055127

(51) Int. Cl.
 H05B 37/02 (2006.01)
 H05B 33/08 (2006.01)
(52) U.S. Cl.
 CPC ........ H05B 33/0818 (2013.01); H05B 33/0884 (2013.01); Y02B 20/346 (2013.01)
(58) Field of Classification Search
 CPC .................. H05B 39/047; H05B 41/3927
 USPC ................ 315/291, 294, 297, 307–308
 See application file for complete search history.

(56) References Cited

U.S. PATENT DOCUMENTS

| | | | | |
|---|---|---|---|---|
| 8,212,493 B2* | 7/2012 | Melanson | ........... | H02M 3/3374 315/247 |
| 8,823,284 B2* | 9/2014 | Saxena | ............... | H05B 33/0815 315/122 |
| 2002/0003525 A1* | 1/2002 | Hwang | .............. | H05B 41/2824 345/102 |
| 2007/0159750 A1* | 7/2007 | Peker | ................. | H05B 33/0869 361/93.1 |
| 2009/0289559 A1* | 11/2009 | Tanaka | ............... | H05B 33/0827 315/185 R |
| 2010/0013412 A1* | 1/2010 | Archibald | .......... | H05B 33/0827 315/294 |
| 2010/0225235 A1* | 9/2010 | Nagase | ............. | H05B 33/0815 315/130 |
| 2010/0327772 A1* | 12/2010 | Lee | .................... | H05B 33/0818 315/297 |
| 2011/0084620 A1* | 4/2011 | Lee | .................... | H05B 33/0818 315/186 |
| 2011/0115770 A1* | 5/2011 | Seo | .......................... | G09G 3/32 345/211 |
| 2011/0193481 A1* | 8/2011 | Nakamura | ......... | H04B 41/2882 315/82 |
| 2012/0025720 A1* | 2/2012 | Chen | .................... | H02M 3/337 315/185 R |
| 2013/0134893 A1* | 5/2013 | Zimmermann | .... | H05B 33/0815 315/224 |

* cited by examiner

Primary Examiner — Jason M Crawford (57) ABSTRACT

A LED driving circuit having a sensing unit is disclosed. The LED driving circuit includes an input unit configured to receive a dimming signal to drive an LED array, a DC-DC converter including a power transistor configured to perform a switching operation, the DC-DC converter being configured to provide an output voltage to the LED array by the switching operation, a PWM signal generating unit configured to provide a PWM signal to adjust power of the LED array to the power transistor, a LED driving unit configured to drive the LED array using the dimming signal, and a sensing unit configured to sense degradation of the power transistor.

21 Claims, 9 Drawing Sheets

| A(PWMI) | B(Comp. out) | Y(Discharge) |
|---------|--------------|--------------|
| 0 | 0 | 1 |
| 0 | 1 | 0 |
| 1 | 0 | 0 |
| 1 | 1 | 0 |

LED DRIVER CIRCUIT HAVING A SENSING UNIT

CROSS-REFERENCE TO RELATED APPLICATIONS

This application claims the benefit under 35 U.S.C. §119 (a) of Korean Patent Application No. 10-2011-0055127, filed on Jun. 8, 2011, in the Korean Intellectual Property Office, the entire disclosure of which is incorporated herein by reference for all purposes.

BACKGROUND

1. Field

The following description relates to an LED driving circuit, such as, for example, an LED driving circuit that senses an error of a power transistor that boosts an LED array.

2. Description of Related Art

Liquid Crystal Displays (LCD) are widely used because they are thinner and lighter and require less driving voltage and power consumption than other display apparatuses. However, since LCDs are non-luminous elements that cannot illuminate themselves, they need additional backlight for supplying light to an LCD panel.

Cold Cathode Fluorescent Lamps (CCFLs) and Light Emitting Diodes (LEDs) are widely used as backlight sources for LCD apparatuses. CCFLs utilize mercury and, as such, create environmental concerns. In addition, CCFLs have slow response speed, have low color reproducibility, and are not adequate for the compact size of an LCD panel.

On the other hand, LEDs do not use pollutant material. As a result, LEDs are relatively environmentally friendly. Further, LEDs are capable of impulse driving, which may serve to increase response speeds. In addition, LEDs have excellent color reproducibility and are able to adjust the light volumes of red, green, and blue light emitting diodes, thereby enabling changes to the brightness, color, and temperature of the light emitted therefrom. Moreover, LEDs are adequate for the compact size of LCD panels. Accordingly, LEDs are widely used as backlight sources in LCD panels.

In a case where a plurality of LEDs are connected in series, such as, for example, in an LED array, in an LCD backlight where LEDs are used, there is needed a driving circuit providing constant current to the LEDs and a DC-DC converter to adjust power to the LEDs. As an example, the DC-DC converter has a power transistor. The DC-DC converter inputs pulse width modulation (PWM) signals provided to a gate of the power transistor. Further, the DC-DC converter performs boosting to drive the LEDs.

Meanwhile, there are cases where such a power transistor is depleted by an extended driving of LEDs, shock, or the like. As such, when the power transistor is depleted, it is unable to maintain a desired output voltage to drive the LEDs. Thus, the power transistor is unable to perform boosting to drive the LEDs. Further, there is not an ability in the related art to sense power transistor depletion in order provide some sort of warning or corrective measure. As a result, the ability to sense power transistor depletion is highly desired.

SUMMARY

In a general aspect, there is provided a LED driving circuit, including an input unit configured to receive a dimming signal to drive an LED array, a DC-DC converter including a power transistor configured to perform a switching operation, the DC-DC converter being configured to provide an output voltage to the LED array by the switching operation, a PWM signal generating unit configured to provide a PWM signal to adjust power of the LED array to the power transistor, a LED driving unit configured to drive the LED array using the dimming signal, and a sensing unit configured to sense degradation of the power transistor.

The general aspect of the LED driving circuit may further provide that a source voltage of the power transistor is used by the sensing unit to sense the degradation of the power transistor.

The general aspect of the LED driving circuit may further provide that the sensing unit includes a first comparator configured to output a first high signal if a voltage level of a source voltage of the power transistor is greater than a voltage level of a predetermined first voltage. The outputted first high signal is used by the sensing unit to sense the degradation of the power transistor.

The general aspect of the LED driving circuit may further provide that the first comparator includes a hysteresis comparator configured to output the first high signal and a low signal, the first high signal being outputted if the voltage level of the source voltage is greater than the voltage level of the predetermined first voltage, the low signal being outputted if the voltage level of the source voltage is less than a voltage level of a predetermined second voltage, the voltage level of the predetermined second voltage being less than the voltage level of the predetermined first voltage.

The general aspect of the LED driving circuit may further provide that the sensing unit further includes a capacitor, a first transistor, and a second comparator, the first transistor being turned on and configured to provide a constant current to the capacitor if the first comparator outputs the first high signal, the second comparator being configured to output a second high signal if a voltage level of the capacitor is greater than a voltage level of a predetermined third voltage. The outputted second high signal is used by the sensing unit to sense the degradation of the power transistor.

The general aspect of the LED driving circuit may further provide that the capacitor includes a capacitance of 1 µF. The constant current is 1 µA. The voltage level of the predetermined third voltage is 1 V.

The general aspect of the LED driving circuit may further provide that the sensing unit further includes a second transistor configured to discharge the capacitor according to an external control signal.

The general aspect of the LED driving circuit may further provide that the sensing unit further includes a recovering unit configured to control the second transistor to discharge the capacitor, if the voltage level of the source voltage of the power transistor is less than a voltage level of a predetermined fourth voltage, the voltage level of the predetermined fourth voltage being less than the voltage level of the predetermined first voltage.

The general aspect of the LED driving circuit may further provide that the recovering unit is further configured to control the second transistor to be turned on, if the dimming signal is a low signal and the voltage level of the source voltage of the power transistor is less than the voltage level of the predetermined fourth voltage.

The general aspect of the LED driving circuit may further provide that the sensing unit further includes a second transistor and a recovering unit, the second transistor being configured to discharge the capacitor, the recovering unit being configured to control the second transistor to discharge the capacitor, if the voltage level of the source voltage of the power transistor is less than a voltage level of a predetermined fourth voltage, the voltage level of the predetermined fourth voltage being less than the voltage level of the predetermined first voltage.

The general aspect of the LED driving circuit may further provide that the recovering unit is further configured to control the second transistor to be turned on, if the dimming signal is a low signal and the voltage level of the source voltage of the power transistor is less than the voltage level of the predetermined fourth voltage.

The general aspect of the LED driving circuit may further provide that the PWM signal generating unit includes a feedback unit configured to compare a voltage level of a node in contact with the LED array and the LED driving unit with a voltage level of a predetermined fifth voltage and output a voltage indicating a result of the comparison, the output voltage of the feedback unit being used by the sensing unit to sense the degradation of the power transistor.

The general aspect of the LED driving circuit may further provide that the sensing unit further includes a capacitor, a first comparator, a first transistor, and a second comparator, the first comparator being configured to output a high signal if a voltage level of the output voltage of the feedback unit is greater than a voltage level of a predetermined first voltage, the first transistor being turned on and configured to provide a constant current to the capacitor if the first comparator outputs the high signal, the second comparator being configured to output an error signal if a voltage level of the capacitor is greater than a voltage level of a predetermined third voltage, the outputted error signal of the second comparator being used by the sensing unit to sense the degradation of the power transistor.

The general aspect of the LED driving circuit may further provide that the first comparator includes a hysteresis comparator configured to output the high signal and a low signal, the high signal being outputted if the voltage level of the output voltage of the feedback unit is greater than the voltage level of the predetermined first voltage, the low signal being outputted if the voltage level of the output voltage of the feedback unit is less than a voltage level of a predetermined second voltage, the voltage level of the predetermined second voltage being less than the voltage level of the predetermined first voltage.

The general aspect of the LED driving circuit may further provide that the capacitor includes a capacitance of 1 µF. The constant current is 1 µA. The voltage level of the predetermined third voltage is 1 V.

The general aspect of the LED driving circuit may further provide that the sensing unit further includes a second transistor configured to discharge the capacitor according to an external control signal.

The general aspect of the LED driving circuit may further provide that the sensing unit further includes a recovering unit configured to control the second transistor to discharge the capacitor, if the voltage level of the output voltage of the feedback unit is less than a voltage level of a predetermined fourth voltage, the voltage level of the predetermined fourth voltage being less than the voltage level of the predetermined first voltage.

The general aspect of the LED driving circuit may further provide that the recovering unit is further configured to control the second transistor to be turned on, if the dimming signal is a low signal and the voltage level of the output voltage of the feedback unit is less than the voltage level of the predetermined fourth voltage.

The general aspect of the LED driving circuit may further provide that the sensing unit further includes a second transistor and a recovering unit, the second transistor being configured to discharge the capacitor; the recovering unit being configured to control the second transistor to discharge the capacitor, if the voltage level of the output voltage of the feedback unit is less than a voltage level of a predetermined fourth voltage, the voltage level of the predetermined fourth voltage being less than the voltage level of the predetermined first voltage.

The general aspect of the LED driving circuit may further provide that the recovering unit is further configured to control the second transistor to be turned on, if the dimming signal is a low signal and the voltage level of the output voltage of the feedback unit is less than the voltage level of the predetermined fourth voltage.

The general aspect of the LED driving circuit may further provide that the PWM signal generating unit includes a signal generating unit, a feedback unit, and a control unit, the signal generating unit being configured to generate the PWM signal to be provided to the power transistor of the DC-DC converter, the feedback unit being configured to compare a voltage level of a node in contact with the LED array and the LED driving unit with a voltage level of a predetermined fifth voltage and outputs a voltage indicating a result of the comparison, the control unit being configured to control the signal generating unit to reset the PWM signal if a voltage level of a first added voltage, where a source voltage of the power transistor and a triangle wave having a predetermined frequency are added, is greater than a voltage level of a second added voltage, where the output voltage of the feedback unit and a predetermined sixth voltage are added.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

Figure 1:
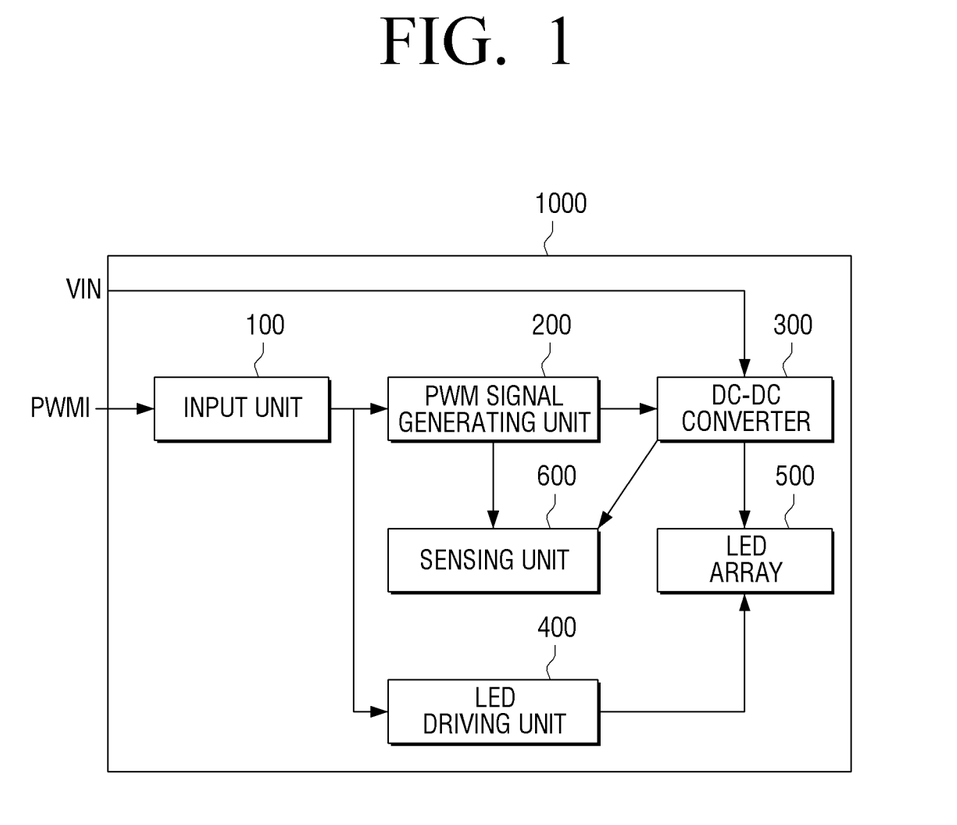
FIG. 1 is a block diagram illustrating a LED driving circuit according to an example embodiment.

FIG. 1 is a block diagram illustrating a LED driving circuit 1000 according to an example embodiment. Referring to FIG. 1, the LED driving circuit 1000 includes an input unit 100, a PWM signal generating unit 200, a DC-DC converter 300, a LED driving unit 400, a LED array 500, and a sensing unit 600.

The input unit 100 receives a dimming signal PWMI to drive the LED array. For example, there are three methods for digital dimming of an LED: direct mode, fixed phase mode, and phase shift mode. Herein, the direct mode is a method of controlling both a PWM frequency and On Duty externally (PAD), whereas the fixed phase mode and phase shift mode are methods of generating a PWM frequency internally in an integrated circuit (IC) while receiving only the On Duty from the PAD. Herein, a dimming signal (PWMI) provides instruction to adjust a brightness, color, and temperature of the LED or compensate for a temperature.

The PWM signal generating unit 200 provides a PWM signal to adjust power of the LED array 500. The PWM signal generating unit 200 will be explained further with reference to FIG. 2.

The DC-DC converter 300 includes a power transistor that performs switching operations. The DC-DC converter 300 provides an output voltage to the LED array according to a switching operation of the power transistor. For example, the DC-DC converter 300 converts a DC voltage based on the provided PWM signal, and provides the converted DC voltage to the LED array 500. Herein, the DC-DC converter 300 may provide, to the LED array 500, a voltage corresponding to a forward direction virus voltage of the LED array 500, thereby enabling the LED array 500 to operate in a saturation region.

The LED driving unit 400 drives the LED array 500 using the dimming signal PWMI. For example, the LED driving unit 400 adjusts a driving current inside the LED array 500 using the dimming signal PWMI.

The sensing unit 600 senses degradation of the power transistor. For example, the sensing unit 600 senses a shut or the like in the power transistor of the DC-DC converter 300. Configuration and operations of the sensing unit 600 will be explained further with reference to FIGS. 3 and 4.

Figure 2:
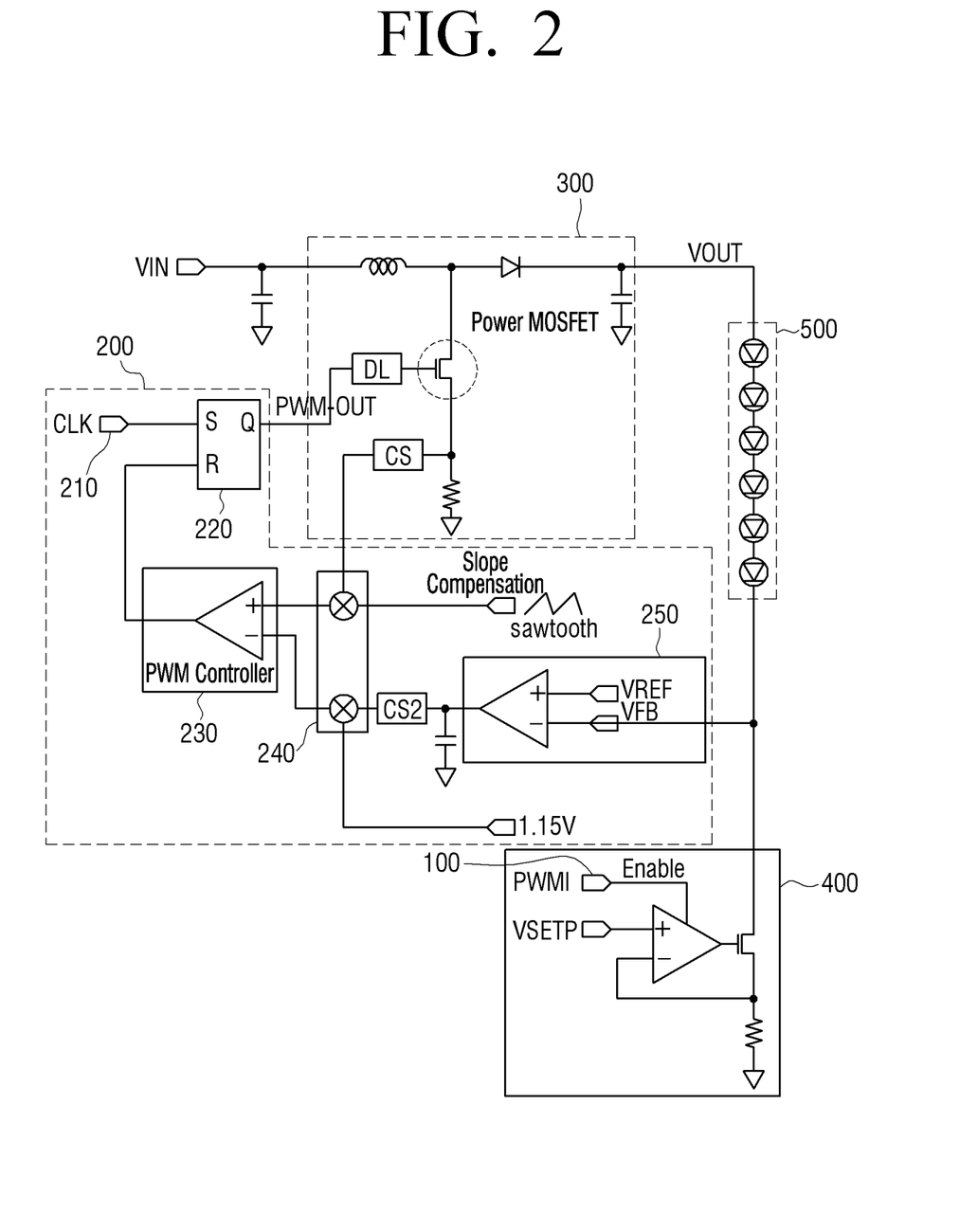
FIG. 2 is a circuit diagram illustrating a LED driving circuit according to an example embodiment.

FIG. 2 is a circuit diagram illustrating a LED driving circuit 1000 according to an example embodiment. Referring to FIG. 2, the LED driving circuit 1000 includes an input unit 100, a PWM signal generating unit 200, a DC-DC converter 300, a LED driving unit 400, and a LED array 500. While a sensing unit 600 is not illustrated in FIG. 2, when embodying the circuit, the circuit in FIG. 3 or FIG. 4 may be provided at one side of FIG. 2.

The input unit 100 receives a dimming signal PWMI to drive the LED array 500 from outside.

The PWM signal generating unit 200 generates a PWM signal PWM_OUT to be provided to the DC-DC converter 300. The PWM signal generating unit 200 includes a clock signal 210, a signal generating unit 220, a control unit 230, a summing unit 240, and a feedback unit 250.

The clock signal 210 has a predetermined frequency. In this example, the clock signal 210 is generated by using an oscillator of the LED driving circuit 1000 itself, received from outside, or the like.

The signal generating unit 220 generates the PWM signal PWM_OUT to be provided to the power transistor of the DC-DC converter 300. For example, the signal generating unit 220 is embodied as an RS flipflop. Herein, the RS flipflop receives the clock signal 210 by a set input and an output of the control unit 230 as a reset input. The RS flipflop outputs '1' when a set signal is input, and outputs '0' when a reset signal is input.

The control unit 230 controls the signal generating unit 220. For example, the control unit 230 includes an OP-AMP that receives a first added voltage, where a source voltage of the power transistor and a triangle wave having a predetermined frequency are added in a positive terminal of the OP-AMP, and a second added voltage, where an output voltage of the feedback unit 250 and a predetermined sixth voltage, such as, for example, 1.5 V, are added in a negative terminal of the OP-AMP. The control unit 230 provides a difference of the first added voltage and the second added voltage to the signal generating unit 220.

The summing unit 240 adds the source voltage of the power transistor of the DC-DC converter 300 and the triangle wave having a predetermined frequency and outputs the sum thereof to the positive terminal of the OP-AMP of the control unit 230. In addition, the summing unit 240 adds the output voltage of the feedback unit 250 and the predetermined sixth voltage and outputs the sum thereof to the negative terminal of the OP-AMP of the control unit 230.

The feedback unit 250 measures a power, such as, for example, a voltage of a node where the LED array 500 meets the LED driving unit 400, supplied to the LED array 500, compares the measured power with a predetermined fifth voltage (or a predetermined reference voltage), and provides the difference thereof to the control unit 230. For example, the voltage V_FB of the node where the LED array 500 meets the LED driving unit 400, an output voltage Vout of the DC-DC converter 300, or the like is measured as the power by the feedback unit 250.

As an example, the DC-DC converter 300 includes an inductor, a power transistor (or booster gate), and a booster switch consisting of diodes. The DC-DC converter illustrated in FIG. 2 performs the same operations as a general booster switcher, and, thus, detailed explanation is omitted.

The LED driving unit 400 is a constant current controller. The LED driving unit 400 illustrated in FIG. 2 is a constant current controller generally used in an LED driving circuit, and thus detailed explanation is omitted.

Figure 3:
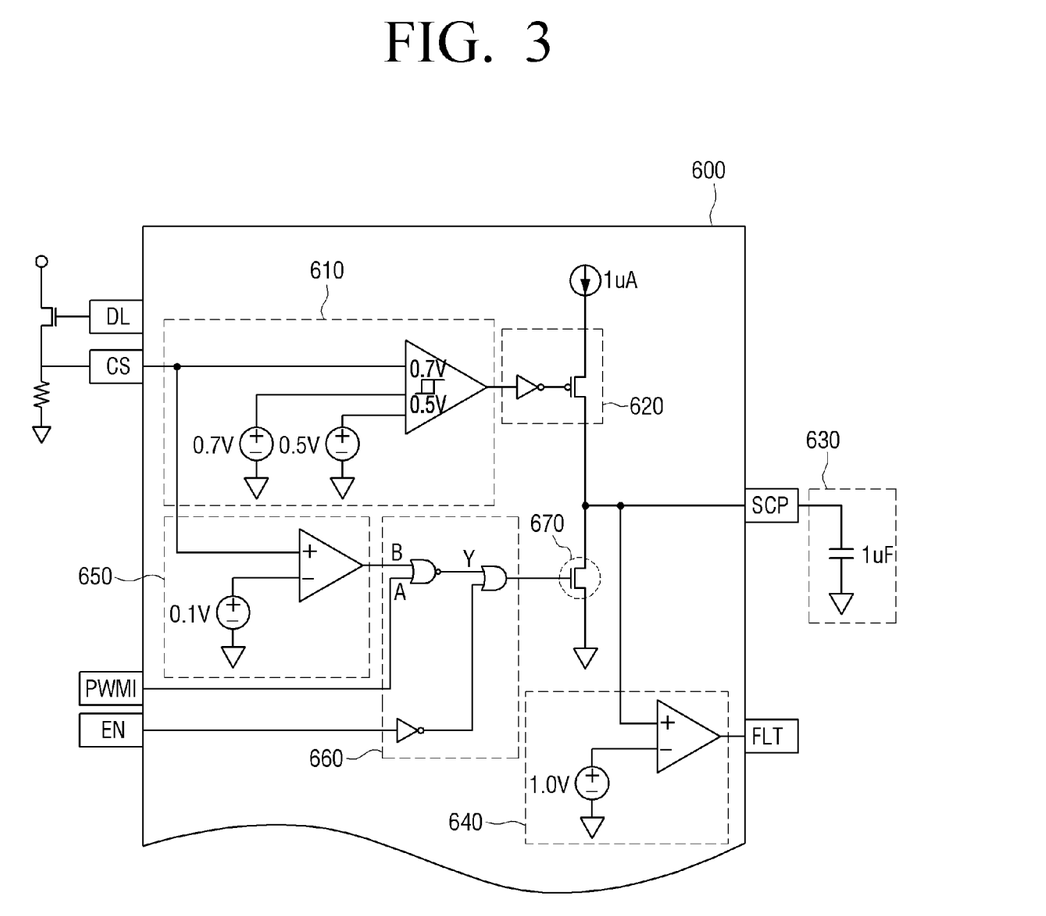
FIG. 3 is a circuit diagram illustrating a sensing unit according to an example embodiment.
Figure 4:
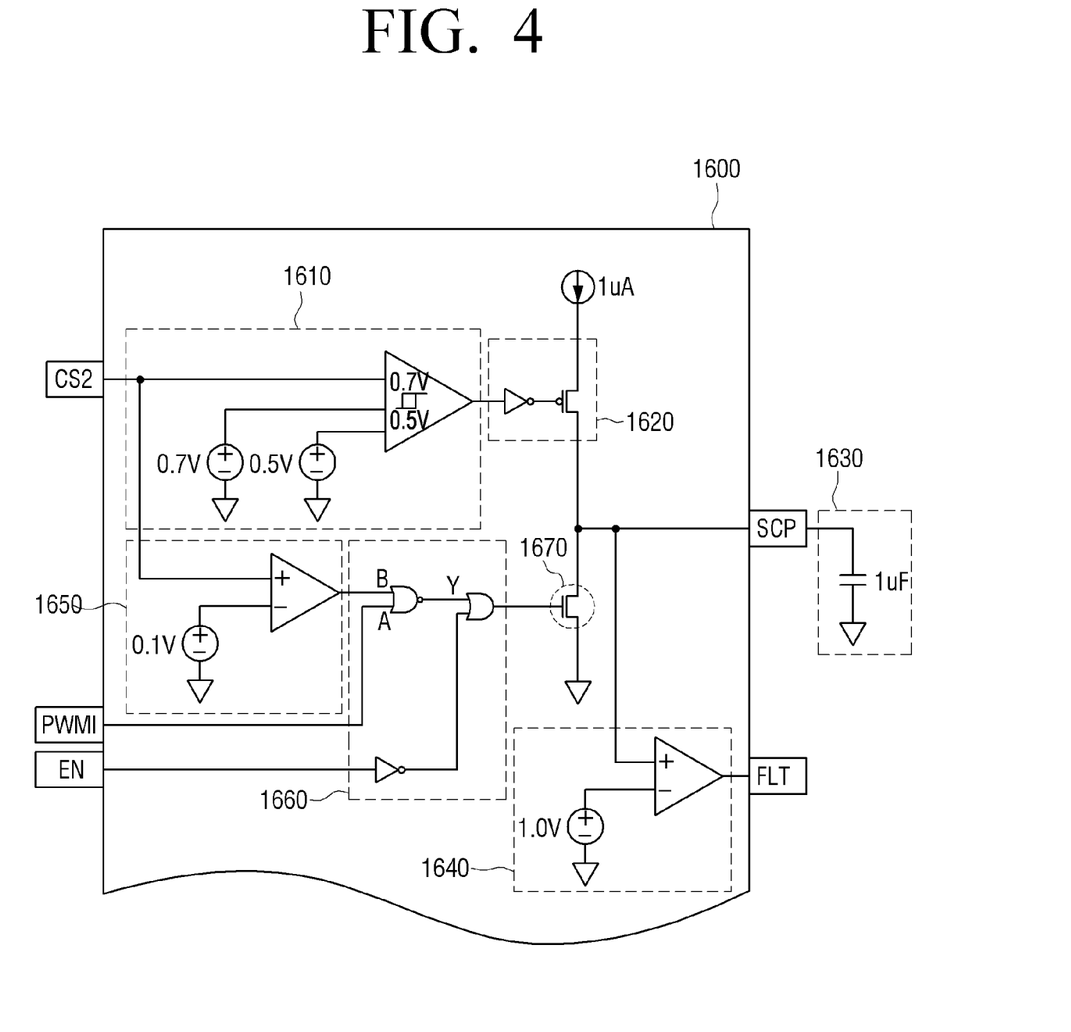
FIG. 4 is a circuit diagram illustrating a sensing unit according to another example embodiment.

The following discussion provides an example of the configuration and operations of the sensing units 600 and 1600 with reference to FIGS. 3 and 4, respectively.

FIG. 3 is a circuit diagram illustrating a sensing unit 600 according to an example embodiment. The sensing unit 600 uses the source voltage of the power transistor of the DC-DC converter 300 to sense degradation of the power transistor. Referring to FIG. 3, the sensing unit 600 includes a first comparator 610, a first transistor unit 620, a capacitor 630, a second comparator 640, and a recovering unit 650, 660, 670.

The first comparator 610 compares the source voltage CS of the power transistor with a predetermined first voltage, such as, for example, 0.7 V. Herein, the first comparator 610 is an OP-AMP having a hysteresis. Therefore, the first comparator 610 compares the source voltage CS of the power transistor with the predetermined first voltage and a predetermined second voltage, such as, for example, 0.5 V.

The first comparator 610 outputs a high signal or a low signal. If the source voltage CS of the power transistor is greater than the predetermined first voltage, the first comparator 610 outputs a high signal. If the source voltage CS of the power transistor is less than the predetermined second voltage, the first comparator outputs a low signal.

Herein, the predetermined first voltage is greater than a range of change of the source voltage that the power transistor can have during normal operation. Therefore, when the source voltage CS of the power transistor is greater than the predetermined first voltage, it is predicted that the power transistor is depleted. However, in a case where the source voltage of the power transistor is greater than the first voltage temporarily due to noise or the like, a verifying operation is performed using a configuration as below.

In this example, the first comparator 610 includes an OP-AMP having a hysteresis, but a general OP-AMP not having a hysteresis may be used. For example, the first comparator 610 may output a high signal if the source voltage CS of the power transistor is greater than the predetermined first voltage and a low signal if the source voltage CS of the power transistor is less than the predetermined first voltage.

When the first comparator 610 outputs a high signal, the first transistor is turned on and provides a constant current, such as, for example, 1 μA, to the capacitor 630. For example, the first transistor unit 620 includes an inverter and a p-channel metal-oxide-semiconductor field-effect (PMOS) transistor.

The inverter reverses the output signal of the first comparator 610. For example, when the first comparator 610 outputs a high signal, the inverter reverses the high signal and outputs a low signal. When the first comparator 610 outputs a low signal, the inverter reverses the low signal and outputs a high signal.

The PMOS transistor provides the constant current to the capacitor according to an output signal of the inverter. For example, a drain of the PMOS transistor is connected to a constant current source, such as, for example, 1 μA, the source of the PMOS transistor is connected to an end of the capacitor, and the gate of the PMOS transistor is connected to an output end of the inverter.

Therefore, when a high signal is input from the first comparator 610, the first transistor unit 620 provides the constant current to the capacitor. When a low signal is input from the first comparator 610, the first transistor unit 620 does not provide the constant current to the capacitor.

In this example, the first transistor includes the PMOS transistor, but is not limited thereto. The first transistor may include an n-channel MOS (NMOS) transistor instead of the PMOS transistor.

The capacitor 630 is charged using the constant current provided through the first transistor unit 620. Herein, a capacitance of the capacitor 630 is 1 μF. In the example embodiment, a capacitor having 1 μF capacitance is used, but the capacitance of the capacitor is not limited thereto.

The second comparator 640 compares the voltage of the capacitor 630 with a predetermined third voltage, such as, for example, 1 V. For example, the second comparator 640 includes an OP-AMP, and the voltage of the capacitor 630 is input in a positive terminal of the OP-AMP. The predetermined third voltage is input in a negative terminal of the OP-AMP. Therefore, if the voltage of the capacitor 630 is greater than the predetermined third voltage, the OP-AMP outputs a high signal.

As a result, when the source voltage CS of the power transistor is greater than or equal to the first voltage, which is, for example, 0.7 V, the PMOS transistor is turned on and the constant current is provided to the capacitor 630. Therefore, the capacitor is charged by the provided constant current. Herein, the voltage of the capacitor is proportionate to a length of time the constant current is provided.

In this example, a capacitor having a constant current of 1 μA and capacitance of 1 μF is used. As a result, the capacitor 630 has the voltage of 1 V one second after being provided with the constant current. That is, when the source voltage CS of the power transistor is 0.7 V or greater, and that state continues for one second or more, the second comparator 640 outputs a high signal. Consequently, the sensing unit 600 is able to sense degradation of the power transistor based on the output signal of the second comparator 640. As a result of the first transistor unit 620, capacitor 630, and second comparator 640, the sensing unit 600 may exclude a case, in which the source voltage CS is temporarily greater than the predetermined first voltage due to noise or the like, from those where the source voltage CS of the power transistor is greater than the predetermined first voltage.

The recovering unit 650, 660, 670 discharges the capacitor 630. For example, the recovering unit 650, 660, 670 includes a third comparator 650, a logical unit 660, and a second transistor 670.

The third comparator 650 compares the source voltage CS of the power transistor with a predetermined fourth voltage. For example, the third comparator 650 includes an OP-AMP, and receives the source voltage CS of the power transistor in a positive terminal of the OP-AMP. The predetermined fourth voltage, such as, for example, 0.1 V, is received in a negative terminal of the OP-AMP. A high signal is outputted from the OP-AMP of the third comparator 650 if the source voltage CS of the power transistor is greater than the predetermined fourth voltage. A low signal is outputted if the source voltage CS of the power transistor is less than the predetermined fourth voltage.

When a dimming signal PWMI is a low signal and an output of the third comparator 650 is a low signal, the logical unit 660 turns on the second transistor 670. In addition, the logical unit 660 turns on the second transistor 670 according to an external control signal. For example, the logical unit 660 includes a NOR gate, an inverter, and an OR gate.

Figure 5:
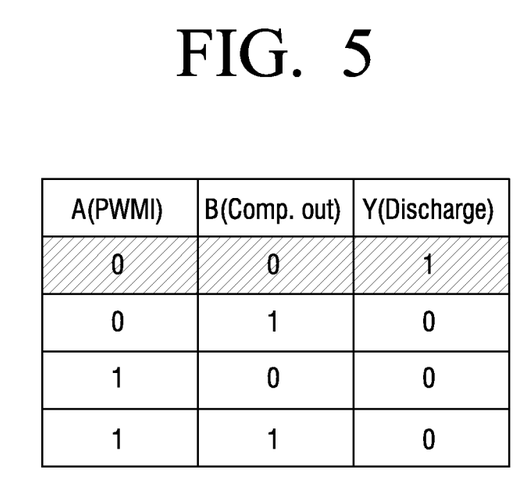
FIG. 5 is a view illustrating an example of a truth table of a NOR gate.

The NOR gate receives the output of the third comparator 650 and the dimming signal PWMI, and operates as in the truth table illustrated in FIG. 5. For example, the logical unit 660 outputs a high signal only when the dimming signal PWMI is a low signal and the output of the third comparator 650 is a low signal.

The inverter reverses an external control signal EN and outputs it. Herein, the external control signal EN controls an operational state of the LED driving circuit 1000. For example, when the external control signal EN is a high signal, the LED driving circuit 1000 and the sensing unit 600 perform the aforementioned operations. However, when the external control signal EN is a low signal, the LED driving circuit 1000 and the sensing unit 600 do not perform the aforementioned operations.

Meanwhile, in the example embodiment, the LED driving circuit 1000 and the sensing unit 600 operate when the external control signal EN is a high signal, but is not limited thereto. The LED driving circuit 1000 and the sensing unit 600 may also operate when the external control signal EN is a low signal. In addition, in the example embodiment, only the examples of using the control signal to control the operational state of the LED driving circuit 1000 were explained, but the control signal may be used to control only the operational state of the sensing unit 600.

The OR gate receives an output signal of the NOR gate and an output signal of the inverter, and, if one of the two signals is a high signal, outputs the high signal.

The second transistor 670 discharges the capacitor. For example, the drain of the second transistor 670 is connected to the source of the PMOS transistor of the first transistor unit 620, and the gate of the second transistor 670 is connected to the output end of the logical unit 660. Herein, the second transistor includes a NMOS. Therefore, when a high signal is received from the logical unit 660, the second transistor is turned on and may discharge the capacitor.

In the example embodiment, the sensing unit 600 includes the first comparator 610, first transistor unit 620, capacitor 630, second comparator 640, and recovering unit 650, 660, 670, but is not limited thereto. The sensing unit 600 may include or use only the first comparator 610 or only the first comparator 610, first transistor unit 620, capacitor 630, and second comparator 640.

FIG. 4 is a circuit diagram illustrating a sensing unit 1600 according to an example embodiment. For example, the sensing unit 1600 uses an output voltage CS2 of the feedback unit 250 to sense degradation of the power transistor. The sensing unit 1600 has a similar configuration as the sensing unit 600, except that the type of power used to sense degradation of the transistor is different. Referring to FIG. 4, the sensing unit 1600 includes a first comparator 1610, a first transistor unit 1620, a capacitor 1630, a second comparator 1640, and a recovering unit 1650, 1660, 1670.

The first comparator 1610 compares the output voltage CS2 of the feedback unit 250 with a predetermined first voltage, such as, for example, 0.7 V. Herein, the first comparator 1610 includes an OP-AMP (comparator) having a hysteresis. Therefore, the first comparator 1610 compares the source voltage CS2 of the feedback unit 250 with the predetermined first voltage and the predetermined second voltage, such as, for example, 0.5 V, outputs a high signal if the source voltage CS2 of the feedback unit 250 is greater than the predetermined first voltage, and outputs a low signal if the source voltage CS2 of the feedback unit 250 is less than the predetermined second voltage. Herein, the predetermined first voltage is greater than a range of change of the source voltage that the power transistor has during a normal operation. Therefore, when the output voltage CS2 of feedback unit is greater than the predetermined first voltage, it can be predicted that the power transistor is depleted. However, in a case where the source voltage of the power transistor is greater than the first voltage temporarily due to noise or the like, a verifying operation is performed as is follows.

In the example embodiment, the first comparator 1610 includes the OP-AMP having a hysteresis, but a general OP-AMP not having a hysteresis may be used as well. That is, the first comparator 1610 may output a high signal if the output voltage CS2 of the feedback unit 250 is greater than the predetermined first voltage and a low signal if the output voltage CS2 of the feedback unit 250 is less than the predetermined first voltage.

When the first comparator 1610 outputs a high signal, the first transistor is turned on and provides a constant current, such as, for example, 1 μA, to the capacitor 1630. For example, the first transistor unit 1620 includes an inverter and a PMOS transistor.

The inverter reverses the output signal of the first comparator 1610. For example, when the first comparator 1610 outputs a high signal, the inverter reverses the high signal and outputs a low signal. When the first comparator 1610 outputs a low signal, the inverter reverses the low signal and outputs a high signal.

The PMOS transistor provides the constant current to the capacitor 1630 according to an output signal of the inverter. For example, a drain of the PMOS transistor is connected to a constant current source, such as, for example, 1 μA, the source of the PMOS transistor is connected to an end of the capacitor 1630, and the gate of the PMOS transistor is connected to an output end of the inverter.

Therefore, when a high signal is input from the first comparator 1610, the first transistor unit 1620 is turned on and provides the constant current to the capacitor 1630. In addition, when a low signal is input from the first comparator 1610, the first transistor unit 1620 is turned off and does not provide the constant current to the capacitor 1630.

Meanwhile, in the example embodiment, the first transistor includes the PMOS transistor, but the first transistor may instead include a NMOS transistor.

The capacitor 1630 is charged using the constant current provided through the first transistor unit 1620. Herein, the capacitor 1630 has a capacitance of 1 μF, but the capacitor 1630 and the capacitance is not limited thereto.

The second comparator 1640 compares the voltage of the capacitor 1630 with a predetermined third voltage, such as, for example, 1 V. For example, the second comparator 1640 includes an OP-AMP, and the voltage of the capacitor 1630 is input in a positive terminal of the OP-AMP. The predetermined third voltage is input in a negative terminal of the OP-AMP. Thus, if the voltage of the capacitor 1630 is greater than the predetermined third voltage, the OP-AMP outputs a high signal.

Therefore, when the output voltage CS2 of the feedback unit 250 is greater than or equal to the first predetermined voltage 0.7 V, the PMOS transistor is turned on and the constant current is provided to the capacitor 1630. Thus, the capacitor 1630 is charged by the provided constant current. Herein, the voltage of the capacitor 1630 is proportionate to a length of time the constant current is provided.

In the example embodiment, a capacitor 1630 has a constant current of 1 μA and a capacitance of 1 μF. Thus, the capacitor 1630 has the voltage of 1 V one second after being provided with the constant current. That is, when the output voltage CS2 of the feedback unit 250 is greater than or equal to 0.7 V, and that state continues for one second or more, the second comparator 1640 outputs a high signal. Consequently, the sensing unit 1600 becomes able to sense degradation of the power transistor based on the output signal of the second comparator 1640. Such a sensing unit 1600 may exclude a case where the output voltage CS2 of the feedback unit 250 is temporarily greater than the predetermined first voltage due to noise or the like of among the cases where the output voltage CS2 of the feedback unit 250 is greater than the predetermined first voltage, in that it has the first transistor unit 1620, capacitor 1630, and second comparator 1640.

The recovering unit 1650, 1660, 1670 discharges the capacitor 1630. For example, the recovering unit 1650, 1660, 1670 includes a third comparator 1650, a logical unit 1660, and a second transistor 1670.

The third comparator 1650 compares the output voltage CS2 of the feedback unit 250 with a predetermined fourth voltage. For example, the third comparator 1650 includes an OP-AMP, and receives the output voltage CS2 of the feedback unit 250 in a positive terminal of the OP-AMP. The third comparator 1650 receives the predetermined fourth voltage, such as, for example, 0.1 V, in a negative terminal of the OP-AMP, outputs a high signal if the output voltage CS2 of the feedback unit 250 is greater than the predetermined fourth voltage, and outputs a low signal if the output voltage CS2 of the feedback unit 250 is less than the predetermined fourth voltage.

When a dimming signal PWMI is a low signal and an output of the third comparator 1650 is a low signal, the logical unit 1660 turns on the second transistor 1670. In addition, the logical unit 1660 turns on the second transistor 1670 according to an external control signal EN. For example, the logical unit 1660 includes a NOR gate, an inverter, and an OR gate.

The NOR gate receives the output of the third comparator 1650 and the dimming signal PWMI, and operates as in the truth table illustrated in FIG. 5. For example, the logical unit 1660 outputs a high signal only when the dimming signal PWMI is a low signal and the output of the third comparator 1650 is a low signal.

The inverter reverses an external control signal EN and outputs it.

The OR gate receives an output signal of the NOR gate and an output signal of the inverter and, if one of the two signals is a high signal, outputs the high signal.

The second transistor 1670 discharges the capacitor. For example, the drain of the second transistor 1670 is connected to the source of the PMOS transistor of the first transistor unit 1620, the source of the second transistor 1670 is connected to a ground, and the gate of the second transistor 1670 is connected to an output end of the logical unit 1660. Herein, the second transistor 1670 includes a NMOS. Therefore, when a high signal is received from the logical unit 1660, the second transistor 1670 is turned on and may discharge the capacitor 1630.

In the example embodiment, the sensing unit 1600 includes the first comparator 1610, the first transistor unit 1620, the capacitor 1630, the second comparator 1640, and the recovering unit 1650, 1660, 1670, but the sensing unit 1600 may include or use only the first comparator 1610, the first transistor unit 1620, the capacitor 1630, and the second comparator 1640.

Figure 6:
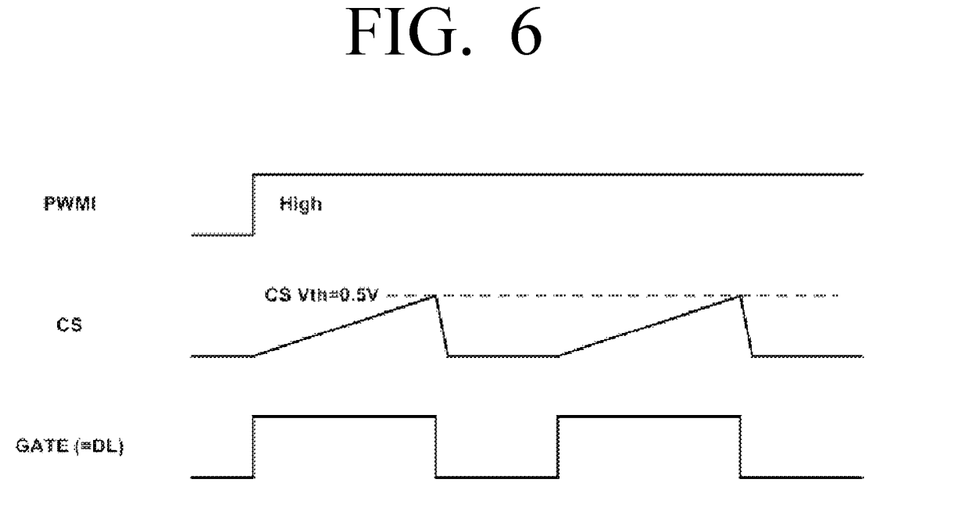
FIG. 6 is a wave diagram illustrating an example of an explanation of operations of a LED driving circuit during normal operation.

FIG. 6 is a wave diagram illustrating an example of an explanation of operations of a LED driving circuit during normal operation. In addition, FIG. 7 is a wave diagram illustrating an example of an explanation of operations of a LED driving circuit during abnormal operation.

Figure 7:
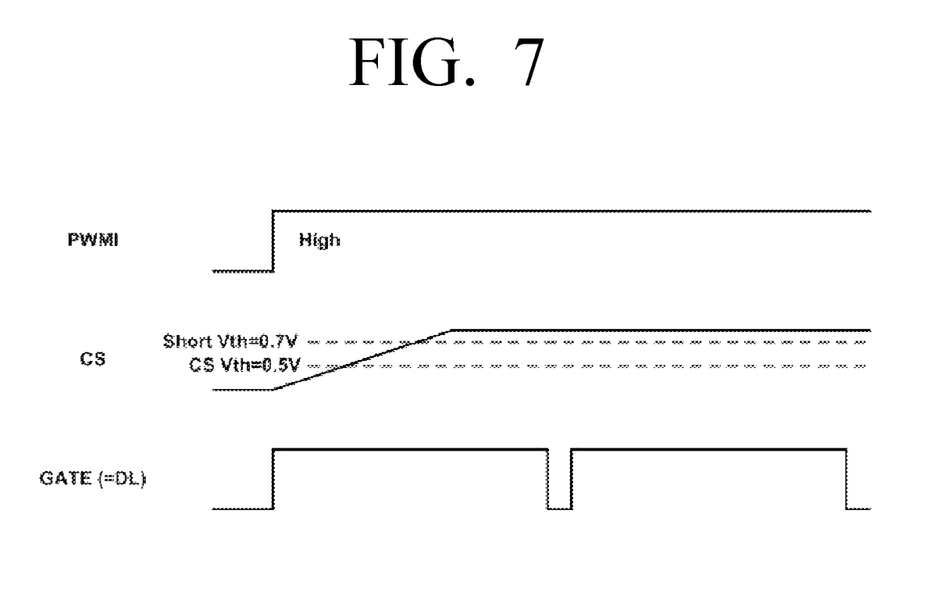
FIG. 7 is a wave diagram illustrating an example of an explanation of operations of a LED driving circuit during abnormal operation.

With reference to FIGS. 6 and 7, in a case where the power transistor is operating normally and when the PWM signal DL input in the gate of the power transistor is turned on, the voltage value of the source voltage CS of the power transistor increases. In addition, when the PWM signal DL input in the gate of the power transistor is turned off, the voltage value of the source voltage CS of the power transistor decreases. Herein, the source voltage of the power transistor has a voltage range of approximately 0 V to 0.5 V.

However, in a case where the power transistor is not operating normally, even if the PWM signal DL input in the gate of the power transistor is turned off, the voltage value of the source voltage CS of the power transistor does not decrease. That is, the power transistor is shut, and maintains the turned on state regardless of the PWM signal DL input in the gate of the power transistor.

As aforementioned, when the power transistor is not operating normally, the source voltage CS of the power transistor maintains a voltage value to be within the normal operation voltage range of approximately 0 V to 0.5 V or greater than that of the normal operation voltage range.

Figure 8:
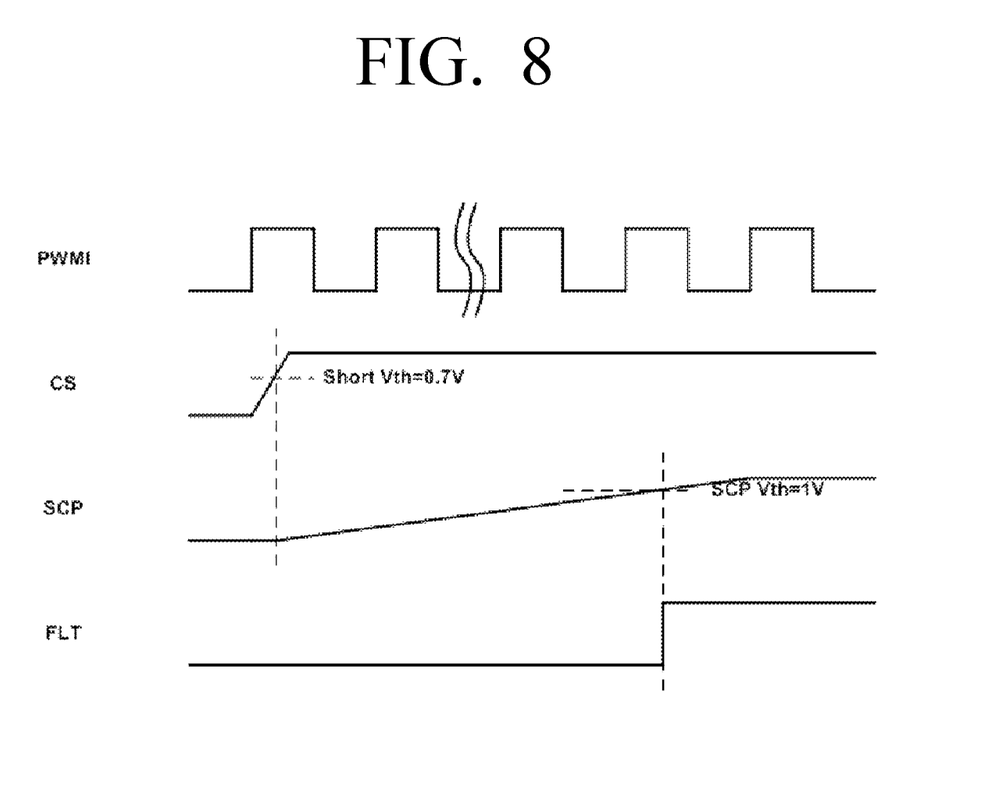
FIGS. 8 and 9 are wave diagrams illustrating examples of explanations of operations of a sensing unit according to an example embodiment.
Figure 9:
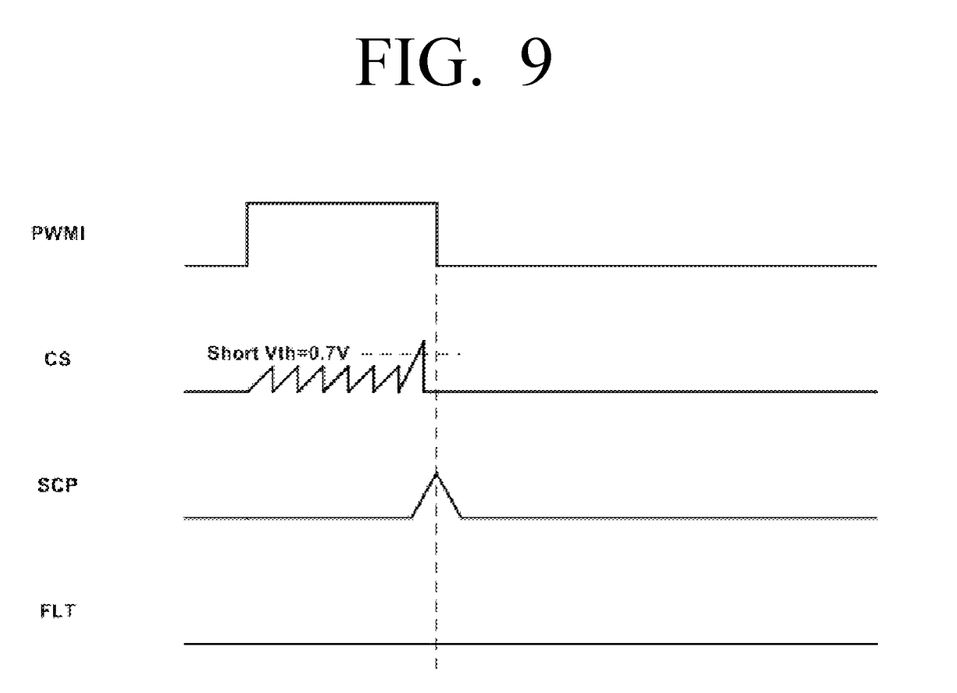

FIGS. 8 and 9 are wave diagrams illustrating examples of explanations of operations of a sensing unit according to an example embodiment. For example, FIG. 8 is a wave diagram in a case where the power transistor is depleted, and FIG. 9 is a wave diagram in a case where noise is temporarily experienced.

With reference to FIG. 8, when the source voltage CS of the power transistor becomes the first predetermined voltage of equal to or greater than 0.7 V by the degradation of the power transistor, the constant current is provided to the capacitor 630, and the capacitor 630 is charged by the provided constant current. Meanwhile, as the constant current is provided to the capacitor 630, the voltage value SCP gradually increases, and the second comparator 640 outputs a high signal FLT when the voltage value SCP of the capacitor 630 is equal to or greater than 1 V. That is, when the source voltage CS of the transistor is maintained to be equal to or greater than a first predetermined voltage, such as, for example, 0.7 V, for a predetermined time, such as, for example, 1 second, or more, the sensing unit 600 may sense that the power transistor is depleted.

With reference to FIG. 9, when the source voltage CS of the power transistor temporarily becomes 0.7 V or greater, the constant current is provided to the capacitor 630, and the capacitor 630 is charged by the provided constant current. However, the source voltage CS of the power transistor immediately becomes 0.5 V or less, thereby serving to halt the supply of the constant current to the capacitor 630.

In addition, as the dimming signal PWMI is a low signal, and the output signal of the third comparator 640 is a low signal, the second transistor 670 is turned on, and the capacitor 630 is discharged. Therefore, the output voltage FLT of the second comparator 640 maintains the low signal.

According to teachings above, there is provided a LED driving circuit that may sense degradation of a power transistor thereof using a sensing unit, thereby enabling a user to easily know of an error related to the LED driving circuit.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An LED driving circuit, comprising:
   an input unit configured to receive a dimming signal to drive an LED array;
   a DC-DC converter, comprising a power transistor, configured to perform a switching operation, wherein the DC-DC converter is configured to use the switching operation to provide an output voltage to the LED array;
   a PWM signal generating unit configured to provide a PWM signal to the power transistor to adjust power of the LED array;
   an LED driving unit configured to use the dimming signal to drive the LED array; and
   a sensing unit configured to sense a degradation of the power transistor.

2. The LED driving circuit according to claim 1, wherein the sensing unit is configured to use a source voltage of the power transistor to sense the degradation of the power transistor.

3. The LED driving circuit according to claim 2,
   wherein the sensing unit comprises:
      a first comparator configured to output a first high signal, when a voltage level of a source voltage of the power transistor is greater than a voltage level of a predetermined first voltage; and
   wherein the sensing unit is configured to use the outputted first high signal to sense the degradation of the power transistor.

4. The LED driving circuit according to claim 3, wherein the first comparator comprises:
   a hysteresis comparator configured to output the first high signal and a low signal;
   wherein the first high signal is outputted when the voltage level of the source voltage is greater than the voltage level of the predetermined first voltage;

wherein the low signal is outputted when the voltage level of the source voltage is less than a voltage level of a predetermined second voltage; and wherein the voltage level of the predetermined second voltage is less than the voltage level of the predetermined first voltage.

5. The LED driving circuit according to claim 3,
wherein the sensing unit further comprises:
   a capacitor,
   a first transistor, and
   a second comparator;
wherein when the first comparator outputs the first high signal, the first transistor is configured to turn on and provide a constant current to the capacitor;
wherein the second comparator is configured to output a second high signal when a voltage level of the capacitor is greater than a voltage level of a predetermined third voltage; and
wherein the sensing unit is configured to use the outputted second high signal to sense the degradation of the power transistor; and
wherein the sensing unit is configured to use a source voltage of the power transistor to sense the degradation of the power transistor.

6. The LED driving circuit according to claim 5,
wherein the capacitor comprises a capacitance of about 1 µF;
wherein the constant current is about 1 µA; and
wherein the voltage level of the predetermined third voltage is about 1 V.

7. The LED driving circuit according to claim 5, wherein the sensing unit further comprises:
   a second transistor configured to discharge the capacitor according to an external control signal.

8. The LED driving circuit according to claim 7,
wherein the sensing unit further comprises:
   a recovering unit configured to control the second transistor to discharge the capacitor, when the voltage level of the source voltage of the power transistor is less than a voltage level of a predetermined fourth voltage; and
wherein the voltage level of the predetermined fourth voltage is less than the voltage level of the predetermined first voltage.

9. The LED driving circuit according to claim 8, wherein the recovering unit is further configured to control the second transistor to be turned on, when the dimming signal is a low signal and the voltage level of the source voltage of the power transistor is less than the voltage level of the predetermined fourth voltage.

10. The LED driving circuit according to claim 5,
wherein the sensing unit further comprises:
   a second transistor, and
   a recovering unit;
wherein the second transistor is configured to discharge the capacitor;
wherein the recovering unit is configured to control the second transistor to discharge the capacitor, when the voltage level of the source voltage of the power transistor is less than a voltage level of a predetermined fourth voltage; and
wherein the voltage level of the predetermined fourth voltage is less than the voltage level of the predetermined first voltage.

11. The LED driving circuit according to claim 10, wherein the recovering unit is further configured to control the second transistor to be turned on, when the dimming signal is a low signal and the voltage level of the source voltage of the power transistor is less than the voltage level of the predetermined fourth voltage.

12. The LED driving circuit according to claim 1,
wherein the PWM signal generating unit comprises a feedback unit configured to compare a voltage level of a node in contact with the LED array and the LED driving unit with a voltage level of a predetermined fifth voltage, and output a voltage indicating a result of the comparison;
wherein the sensing unit is configured to use the output voltage of the feedback unit being to sense the degradation of the power transistor.

13. The LED driving circuit according to claim 12,
wherein the sensing unit further comprises:
   a capacitor,
   a first comparator,
   a first transistor, and
   a second comparator;
wherein the first comparator is configured to output a high signal when a voltage level of the output voltage of the feedback unit is greater than a voltage level of a predetermined first voltage;
wherein the first transistor is turned on and configured to provide a constant current to the capacitor when the first comparator outputs the high signal;
wherein the second comparator is configured to output an error signal when a voltage level of the capacitor is greater than a voltage level of a predetermined third voltage; and
wherein the outputted error signal of the second comparator is used by the sensing unit to sense the degradation of the power transistor.

14. The LED driving circuit according to claim 13,
wherein the first comparator comprises a hysteresis comparator configured to output the high signal and a low signal;
wherein the high signal is outputted when the voltage level of the output voltage of the feedback unit is greater than the voltage level of the predetermined first voltage;
wherein the low signal is outputted when the voltage level of the output voltage of the feedback unit is less than a voltage level of a predetermined second voltage; and
wherein the voltage level of the predetermined second voltage is less than the voltage level of the predetermined first voltage.

15. The LED driving circuit according to claim 13,
wherein the capacitor comprises a capacitance of about 1µF;
wherein the constant current is about 1µA; and
wherein the voltage level of the predetermined third voltage is about 1 V.

16. The LED driving circuit according to claim 13,
wherein the sensing unit further comprises:
   a second transistor configured to discharge the capacitor according to an external control signal.

17. The LED driving circuit according to claim 16,
wherein the sensing unit further comprises:
   a recovering unit configured to control the second transistor to discharge the capacitor, when the voltage level of the power transistor is less than a voltage level of a predetermined fourth voltage; and
wherein the voltage level of the predetermined fourth voltage is less than the voltage level of the predetermined first voltage.

18. The LED driving circuit according to claim 17, wherein the recovering unit is further configured to control the second transistor to be turned on, when the dimming signal is a low signal and the voltage level of the power transistor is less than the voltage level of the predetermined fourth voltage.

19. The LED driving circuit according to claim 13,
wherein the sensing unit further comprises:
a second transistor, and
a recovering unit;
wherein the second transistor is configured to discharge the capacitor;
wherein the recovering unit is configured to control the second transistor to discharge the capacitor, when the voltage level of the power transistor is less than a voltage level of a predetermined fourth voltage; and
wherein the voltage level of the predetermined fourth voltage is less than the voltage level of the predetermined first voltage.

20. The LED driving circuit according to claim 19, wherein the recovering unit is further configured to control the second transistor to be turned on, when the dimming signal is a low signal and the voltage level of the power transistor is less than the voltage level of the predetermined fourth voltage.

21. The LED driving circuit according to claim 1,
wherein the PWM signal generating unit comprises:
a signal generating unit,
a feedback unit, and
a control unit;
wherein the PWM signal generating unit is configured to generate the PWM signal to be provided to the power transistor of the DC-DC converter;
wherein the feedback unit is configured to compare a voltage level of a node in contact with the LED array and the LED driving unit, with a voltage level of a predetermined fifth voltage, and to output a voltage indicating a result of the comparison;
wherein the control unit is configured to control the signal generating unit to reset when a voltage level of a first added voltage is greater than a voltage level of a second added voltage when a source voltage of the power transistor and a triangle wave having a predetermined frequency are added, and when the output voltage of the feedback unit and a predetermined sixth voltage are added.

\* \* \* \* \*